United States Patent

Horsky et al.

(10) Patent No.: US 8,144,444 B2
(45) Date of Patent: Mar. 27, 2012

(54) EMC PROTECTION CIRCUIT

(75) Inventors: Pavel Horsky, Brno (CZ); Petr Kamenicky, Brno (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 228 days.

(21) Appl. No.: 12/190,535

(22) Filed: Aug. 12, 2008

(65) Prior Publication Data

US 2009/0066403 A1 Mar. 12, 2009

(30) Foreign Application Priority Data

Aug. 17, 2007 (EP) ..................................... 07075702

(51) Int. Cl.
H02H 3/22 (2006.01)
(52) U.S. Cl. .......................................................... 361/111
(58) Field of Classification Search .................... 361/111
See application file for complete search history.

(56) References Cited

U.S. PATENT DOCUMENTS

| | | | |
|---|---|---|---|
| 3,551,705 A * | 12/1970 | Juliusburger | 327/263 |
| 4,423,456 A | 12/1983 | Zaidenweber | |
| 5,153,802 A * | 10/1992 | Mertz et al. | 361/18 |
| 5,617,014 A | 4/1997 | Danstrom | |
| 5,764,465 A | 6/1998 | Mattes et al. | |
| 5,889,393 A | 3/1999 | Wrathall | |
| 5,973,902 A * | 10/1999 | King | 361/111 |
| 6,424,585 B1 * | 7/2002 | Ooishi | 365/226 |
| 6,429,550 B1 | 8/2002 | Braun et al. | |
| 6,611,410 B1 | 8/2003 | Makaran | |
| 6,819,535 B2 * | 11/2004 | Merceron et al. | 361/18 |
| 6,909,585 B2 | 6/2005 | Broulim et al. | |
| 7,002,387 B2 | 2/2006 | Donoghue et al. | |
| 7,504,750 B2 * | 3/2009 | Bienvenu et al. | 307/138 |
| 7,564,230 B2 * | 7/2009 | Liwinski | 323/280 |
| 2007/0001657 A1 | 1/2007 | Mellachurvu et al. | |

FOREIGN PATENT DOCUMENTS

EP 1357658 A1 10/2003
* cited by examiner

Primary Examiner — Rexford N Barnie
Assistant Examiner — Ann Hoang
(74) Attorney, Agent, or Firm — Rennie William Dover (57) ABSTRACT

A protection circuit for protecting an electronic circuit against EMC disturbances and/or negative transient overvoltage pulses comprises a switch in series between a power supply and the electronic circuit to be protected; a comparator for comparing a first operating parameter with a second operating parameter and producing a comparison signal, the comparison signal being used as a control signal for controlling opening and closing of the switch; and a delay circuit adapted for delaying closing of the switch. A corresponding method is also provided.

23 Claims, 3 Drawing Sheets

EMC PROTECTION CIRCUIT

CROSS-REFERENCE TO RELATED APPLICATIONS

This patent application claims the benefit of European Patent Application Serial No. 07075702.6 filed Aug. 17, 2007, which patent application is incorporated herein by reference in its entirety.

BACKGROUND

1. The Field of the Invention

The present invention relates to electronic circuits and more specifically to methods and devices for protecting electronic circuits. In embodiments of the present invention, the protection circuit is preventing reverse current flow from an output of a low drop regulator to a supply (battery) and has good resilience to electromagnetic disturbances on the supply line. The methods and devices of the present invention may for example be used in a harsh environment such as an automotive environment. They can handle transient negative overvoltage pulses without influencing functionality of the electronic circuit during such pulses. They furthermore improve susceptibility of the electronic circuits against electromagnetic disturbances on the supply line.

The protection circuit can be also used if reverse battery protection or mis-wiring protection is required. In embodiments of the present invention it is protecting from damage a circuit if polarity of the supply source is reverted and supply potential (VCC) is below ground.

2. Background of the Invention

Fast development of electronics in the last years with an increasing number of transistors in circuits, increasing clock frequency together with the existence of more mobile communications (GSM, UMTS, . . . ) sets higher and higher requirements for electromagnetic compatibility of electronic devices.

Especially for automotive electronics there are new and more severe requirements defined by new standards. The Bulk Current Injection (BCI) test (defined by ISO 11452, part 4) or transient pulse overvoltage immunity (so-called Schaffner pulses) are only two examples. The slow direct capacitive coupling (DCC) method or inductive coupling clamp (ICC) method pulses are additional examples of standards with more severe requirements (defined by ISO/CD 7637-3:2004).

During the development phase of an electrical circuit, e.g. an ASIC, typically most of the attention is paid to the functional and parametric behavior of the circuit. The EMC behavior is too often neglected during the design phase and has to be corrected after the prototype phase, which increases the costs and prolongs the time to market.

U.S. Pat. No. 4,423,456 describes a protection circuit for protecting an electrical circuit from damage due to polarity reversal of the power supply. In its most elementary form, the protection device comprises a transistor switch adapted for opening the power source to load circuit upon polarity reversal. The transistor is a P-channel enhancement MOSFET of which the source is coupled to the positive terminal of the power supply and the drain is coupled to the positive terminal of the load. If the power supply is applied with proper polarity, the gate of the transistor switch is negative with regard to the source of the transistor switch, and current flows from the source to the drain of the transistor switch. This represents normal operation. Should the power supply polarity be reversed by improper battery insertion, the gate of the transistor switch becomes more positive than the source. This effectively results in an infinite source-to-drain resistance, thereby protecting the load from the polarity reversal.

EP-1357658 describes a protection circuit against voltage transients and polarity reversal. It uses a main protection transistor and switching circuit to control its gate in case of negative voltage on the supply line. A disadvantage of the solution described is that it requires and uses thick gate NMOS devices, which results in a quite high voltage drop over the NMOS switching transistor or a need for a charge pump.

SUMMARY OF THE INVENTION

The present invention relates to electronic circuits and methods able to meet EMC requirements. It is an object of embodiments of the present invention to provide a protection system for protecting an electronic circuit from damage by EMC disturbances on a power supply. It is an object of embodiments of the present invention to provide a supply system for an electronic component e.g. an integrated circuit such as an ASIC, which supply system is able to operate under EMC disturbances on the supply line. It is an advantage of embodiments of the present invention that a circuit is protected so as to be able to work correctly during transient overvoltage pulses and EMC disturbances.

The above objectives are accomplished by a method and device according to the present invention.

In a first aspect, the present invention provides a protection circuit for protecting an electronic circuit against EMC disturbances and/or negative transient overvoltage pulses. The protection circuit comprises a switch in series between a power supply and the electronic circuit to be protected; a comparator for comparing a first operating parameter with a second operating parameter and producing a comparison signal, the comparison signal being used as a control signal for controlling opening and closing of the switch; and a delay circuit adapted for delaying closing of the switch. In other words, the delay circuit thus may be adapted for delaying the switch to jump to an ON state, e.g. to delay the switch from becoming conducting. The delay circuit thus may be adapted for keeping the switch in an OFF state or in an open status, e.g. in a non-conducting status.

It is an advantage of embodiments of the present invention that the electronic circuit to be protected is not exposed to reverse over-current and/or destroyed in case of negative overvoltage pulses on the supply line or reverse battery voltage connected to the supply line. It is an advantage of embodiments of the present invention that the circuit to be protected remains operational during high EMC disturbances and transient negative overvoltage pulses.

In embodiments of the present invention the switch is a transistor switch. The transistor switch may be a PMOS transistor. A PMOS transistor switch may be advantageous because it is easier to control than an NMOS transistor switch and no charge pump is needed. Therefore, when using a PMOS transistor switch the needed area may be smaller than when using an NMOS transistor switch. The transistor switch may be made in CMOS processing technology.

In embodiments of the present invention, the first and second operating parameters may be voltages. The first voltage may be a reference voltage. The second voltage may be a supply voltage of the power supply. Alternatively the second voltage may be a representative part of the supply voltage of the power supply.

In alternative embodiments, the first and second operating parameters may be currents. In this case, in particular the operating parameters may be polarity of current. If current is flowing in a first direction, from the power supply to the circuit to be protected, the switch is on. If the current starts to flow into another direction, the switch is off and the current is blocked.

The delay circuit may be adapted for keeping the switch off for a pre-determined amount of time after the comparison signal switches to a value suitable for switching the switch on. In particular for the case of the operating parameters being voltages, the delay circuit may be adapted for keeping the switch off for a pre-determined amount of time after the second operating parameter comes back to a value above the first operating parameter. The pre-determined amount of time may be equal to or longer than the maximum duration of an EMC pulse. The delay circuit may ensure the protection switch is continuously off during the whole duration of the EMC disturbance and therefore any significant reverse current to the supply from the protected circuit due to transient effects in the protection circuit can be avoided (e.g. delay of the comparator and/or protection switch causing delayed switching off of the protection switch).

In embodiments of the present invention, the protection circuit may comprise a diode in parallel with the switch. The diode in parallel with the protection switch may take care to supply the protected circuit while the protection switch is off.

A protection circuit according to embodiments of the present invention may furthermore comprise a level shifter between the delay circuit and the switch, for level shifting output signals of the delay circuit so as to be suitable to control switching of the switch.

In a second aspect, the present invention provides an integrated circuit supply, comprising a voltage regulator and a protection circuit according to embodiments of the present invention coupled between the power supply and the voltage regulator.

In a third aspect the present invention provides a method for protecting an electronic circuit against EMC disturbances and/or negative transient overvoltage pulses. The method comprises opening a switch when comparison of a first operating parameter and a second operating parameter delivers a control signal suitable for switching off the switch; once opened, keeping the switch open as long as the comparison of the first operating parameter with the second operating parameter delivers a control signal suitable for keeping the switch off and a pre-determined amount of time beyond the moment the comparison of the first operating parameter with the second operating parameter delivers a control signal suitable for switching on the switch.

In a method according to embodiments of the present invention, the first and second operating parameters may be voltages. The first operating parameter may be a reference voltage. The second operating parameter may be a supply voltage of a power supply.

In alternative embodiments, the first and second operating parameters may be currents. In this case, in particular the operating parameters may be polarity of current. If current is flowing in a first direction, from the power supply to the circuit to be protected, the switch is on. If the current starts to flow into another direction, the switch is disabled and the current is blocked.

Keeping the switch off for a pre-determined amount of time beyond the moment the comparison of the first operating parameter with the second operating parameter delivers a control signal suitable for switching on the switch may comprise, in particular for the case of the operating parameters being voltages, keeping the switch off for a pre-determined amount of time after the second operating parameter comes back to a value above the first operating parameter. The pre-determined amount of time may be equal to or longer than the maximum duration of an EMC pulse.

In embodiments of the present invention, the protected electronic circuit, e.g. the protected integrated circuit such as an ASIC, functions within specifications during transient negative overvoltage pulses on the supply line, when the main supply of the circuit is decreased or even negative, e.g. due to negative overvoltage pulses on the supply line, and is not sufficient to supply the electronic circuit. To guarantee this functionality, in accordance with embodiments of the present invention the low voltage part of the electronic circuit, e.g. the integrated circuit such as an ASIC, has to stay supplied. The energy needed to supply the electronic circuit when the main supply is lost needs to be stored on a memory device, typically a capacitor, which is typically external to the electronic circuit, e.g. chip. This capacitor is typically a decoupling/tank capacitor on low voltage regulated supply of the circuit. The energy stored on this tank capacitor needs to be sufficient to supply the electronic circuit during the pulse and the supply voltage has to stay above Power On Reset (POR) level.

The protection circuit according to embodiments of the present invention can be used when the electronic circuit has to function within specification during a disturbance on the supply line. It can also be used if correct functionality is required just after the disturbance on the supply line but during the disturbance, the correct functionality is not required (e.g. when the main supply also works as a voltage reference for the circuit; when this reference is lost, no functionality can be guaranteed). In the second case a Power On Reset (POR) may not be allowed because the boot up time of the electronic circuit, e.g. an integrated circuit such as an ASIC, can be too long for a specific application.

A protection circuit according to embodiments of the present invention also provides good resilience of the electronic circuit to electromagnetic disturbances on the supply line.

A protection circuit according to embodiments of the present invention can avoid expensive external solutions especially if Power On Reset (POR) due to disturbances caused by transient overvoltage pulses is not allowed.

The protection circuit according to embodiments of the present invention can be used in combination with any electronic circuit which needs to be protected. In particular, the protection circuit according to embodiments of the present invention can be used with any IC, e.g. any ASIC, for example driver ICs. As particular examples, the protection circuit according to embodiments of the present invention can be used in combination with any IC with supply regulator, especially for example in automotive ICs.

It is an advantage of a supply system according to embodiments of the present invention that it is capable of handling transient pulses on the supply line. Such transient pulses on the supply line, also called transient overvoltage pulses or Schaffner pulses, can create cuts of the main supply going to the electronic circuit, e.g. ASIC. It is an advantage of embodiments of the present invention that the electronic circuit, e.g. an integrated circuit such as an ASIC, can stay functional during such pulses.

Especially immunity to slow DCC pulses according to the standard ISO/CD 7637-3:2004 is standing new requirement. According to the new requirement, an integrated circuit such as an ASIC should not go into reset during such pulses. It is an advantage of embodiments of the present invention that they show immunity to such slow DCC pulses. It is an advantage of embodiments of the present invention that the energy needed for the integrated circuit, e.g. the ASIC to operate when the main power supply (VCC) is too low or negative is stored on an external capacitor connected to the low voltage supply (VREG). It is an advantage of embodiments of the present invention that effective use is made of this charge, and that this charge will not be drained of to the power supply.

It is an advantage of embodiments of the present invention that the protection circuit of the present invention not only protects the electronic circuit not to be destroyed during EMC disturbances and transient overvoltage pulses, but that at the same time that circuit remains operational.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable protection circuits for electronic circuits, e.g. for integrated circuits such as ASICs.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

In the different figures, the same reference signs refer to the same or analogous elements.

DETAILED DESCRIPTION OF THE PREFERRED EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

It is to be noticed that the term "comprising" should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled" should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein may include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Reference will be made to transistors. These are three-terminal devices having a first main electrode such as a drain, a second main electrode such as a source and a control electrode such as a gate for controlling the flow of electrical charges between the first and second main electrodes. It will be clear for a person skilled in the art that the present invention is also applicable to similar devices that can be configured in any transistor technology, including for example, but not limited thereto, CMOS, BICMOS, Bipolar and SiGe BICMOS technology.

Furthermore the findings of the present invention are explained with reference to CMOS technology, i.e. PMOS and NMOS transistors as an example, but the present invention includes within its scope a complementary device whereby PMOS and NMOS transistors become NMOS and PMOS transistors, respectively. A skilled person can make such modifications without departing from the true spirit of the invention. Basically PMOS is bigger than NMOS, but NMOS requires additional circuits like a charge pump, and special ESD protection may be needed, so that the PMOS solution as illustrated in the drawings is smaller in the end, thus saving semiconductor space. In particular embodiments, a complementary solution to the described circuit may be used, with an NMOS transistor rather than a PMOS transistor, the NMOS transistor then being coupled to the ground node rather than to the power supply VCC.

Figure 1:
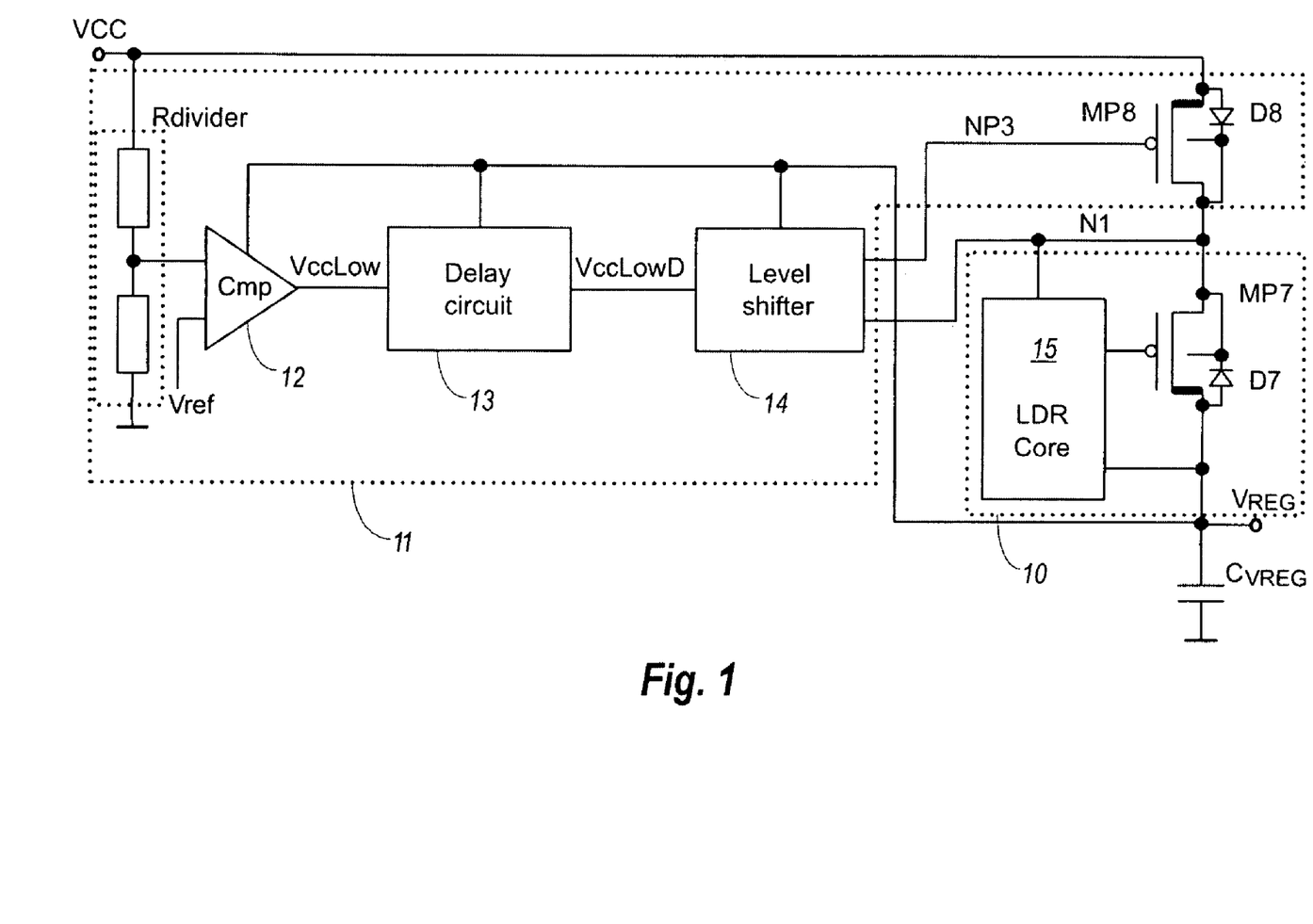
FIG. 1 is a block-schematic illustration of a protection device according to embodiments of the present invention for protection of an electronic circuit against negative pulses on the supply line, while keeping low voltage drop of a regulator.

As an example, FIG. 1 illustrates a low drop regulator 10 for use with a protection circuit 11 according to an embodiment of the present invention, having as input a power supply voltage VCC, and as output a regulated voltage VREG. The low drop regulator 10 (indicated in the drawing just by a low drop regulator (LDR) core 15 and an output stage transistor MP7) provides a stabilized supply voltage VREG to a subsequent electronic circuit (not illustrated), in particular e.g. for automotive and industrial electronic systems. The output stage transistor MP7 in the low drop regulator 10 is used for regulation of the output voltage VREG and also for protection of the following low voltage circuits (not illustrated) supplied from VREG voltage against positive overvoltages on the power supply (VCC). The output stage transistor MP7 may be a high voltage type transistor such as e.g. a DMOS type transistor for protection against high voltages. The low drop regulator 10 is provided, in accordance with embodiments of the present invention, with a protection circuit 11 for protecting the electronic circuit (not illustrated) against dangerous negative overvoltages which may always be present on a supply line, e.g. a battery rail of a car. Such overvoltages may be due to EMC disturbances, for example. In the light of the present invention, EMC disturbances may include transient overvoltage pulses (Schaffner pulses) and EMC resilience, e.g. for electromagnetic (EM) field, coupled electromagnetic disturbances into the supply and signal lines, etc. In embodiments of the present invention, the protection circuit 11 protects a subsequent load circuit against EMC signals present at the power supply VCC. In embodiments of the present invention, the protection circuit 11 enhances a conventional low drop regulator 10 by provision of a controlled PMOS transistor switch MP8 with its bulk connected to the protected circuitry like the low drop regulator 10. The PMOS transistor switch MP8 is used for negative overvoltage protection, and for blocking reverse current from the output terminal VREG of the low drop regulator 10 to the power supply VCC during a disturbance on the power supply VCC. The PMOS transistor switch MP8 may be a high voltage type transistor, such as e.g. a DMOS type transistor for protection against high voltages.

The power supply voltage VCC is continuously monitored by a comparator 12, e.g. a fast comparator. In the comparator 12, the power supply voltage VCC, or a representative part thereof obtained by a voltage division over a resistive divider Rdivider, is compared to a reference voltage Vref and a corresponding comparison signal VCCLow is generated. This comparison signal VCCLow is supplied to the gate of the PMOS transistor switch MP8 of the protection circuit. The reference voltage Vref may be a fixed reference voltage. A portion of VREG or VREG also can be used as reference voltage Vref.

During normal operation (without disturbances, e.g. EMC disturbances, on the power supply VCC), when the power supply voltage VCC is above a defined threshold voltage defined by the reference voltage Vref, the comparison signal VCCLow is low and the PMOS transistor switch MP8 is on, i.e. it is made conductive. There is a low voltage drop over this transistor switch MP8, and thus the total regulator voltage drop can be very small. The transistor switch MP8 has a built in drain-to-bulk diode D8, and the voltage drop over the transistor switch MP8 should be preferably smaller than the threshold voltage Vt of the bulk diode D8 in order not to activate this diode.

If the power supply voltage VCC is decreased below the defined threshold voltage, which is defined by the reference voltage Vref (typically below a minimally allowed operational power supply voltage VCC), the comparison signal VCCLow is set high by the comparator 12. The comparator 12 preferably is a fast comparator, which is adapted to quasi instantaneously react to changes in the power supply voltage VCC and adapt its output signal VCCLow correspondingly. When VCCLow is set high, the transistor switch MP8 is switched off, i.e. is made non-conductive. With transistor switch MP8 off, any current from the output terminal VREG to the power supply VCC is disabled.

During negative transient overvoltage pulses the transistor switch MP8 is switched off, thus preventing that a high current flows from the output terminal VREG of the low voltage drop regulator to the power supply VCC, thus discharging the memory element, e.g. capacitor CVREG, where energy is stored to survive the pulse.

Without presented protection circuit, EMC disturbances having EMC signals with higher amplitudes could cause a decrease of the regulated voltage VREG by discharging the memory element, e.g. capacitor CVREG, to the power supply VCC. During EMC disturbances on the power supply VCC (e.g. a superposed harmonic signal on the power supply VCC), if the voltage on the power supply VCC goes below the regulated voltage VREG, without the transistor switch MP8 protection in accordance with embodiments of the present invention the regulated voltage VREG would be fastly discharged to power supply VCC via diode D7 of the output transistor MP7 (inherent drain bulk diode) of the low drop regulator 10. This discharge is not current limited, therefore a high current would fastly discharge the capacitor CVREG, and the voltage on the output terminal VREG would therefore decrease. When the voltage on the power supply VCC is higher than the regulated voltage VREG, the low drop regulator 10 will try to recharge the capacitor CVREG, but in this case the current is limited. With this non symmetrical behaviour the EMC resilience is not very good and the regulated voltage VREG will be strongly influenced, and can be going out of the operating range. During such EMC disturbances with higher amplitudes, in accordance with embodiments of the present invention, the fast comparator 12 will toggle and set its output signal VCCLow high. In FIG. 1 the line from output terminal VREG to comparator 12, delay circuit 13 and level shifter 14 indicates from where these blocks are supplied. The comparator 12, delay circuit 13 and level shifter 14 use the regulated voltage VREG as main supply. This means that when the power supply voltage VCC is too low during the transient pulses, these blocks are supplied from the memory element, e.g. tank capacitor, on the output terminal VREG.

According to embodiments of the present invention, a delay circuit 13 is provided at the output of the comparator 12 to keep transistor switch MP8 off during the full period of the EMC disturbance. The delay circuit 13 receives as input the comparison signal VccLow and generates as output a delayed signal VCCLowD. If the comparison signal VccLow goes high, the output signal VccLowD of the delay circuit 13 immediately goes high as well. On the other hand, if the comparison signal VccLow goes low, it takes some delay time before the output signal VccLowD of the delay circuit 13 goes back to low level as well.

The delay time of the delay circuit 13 when the VccLow signal goes high may be equal to or longer than the maximum duration of negative part of an EMC pulse or longer than half of the period of EMC signal for sinusoidal EMC signal.

Figure 3:
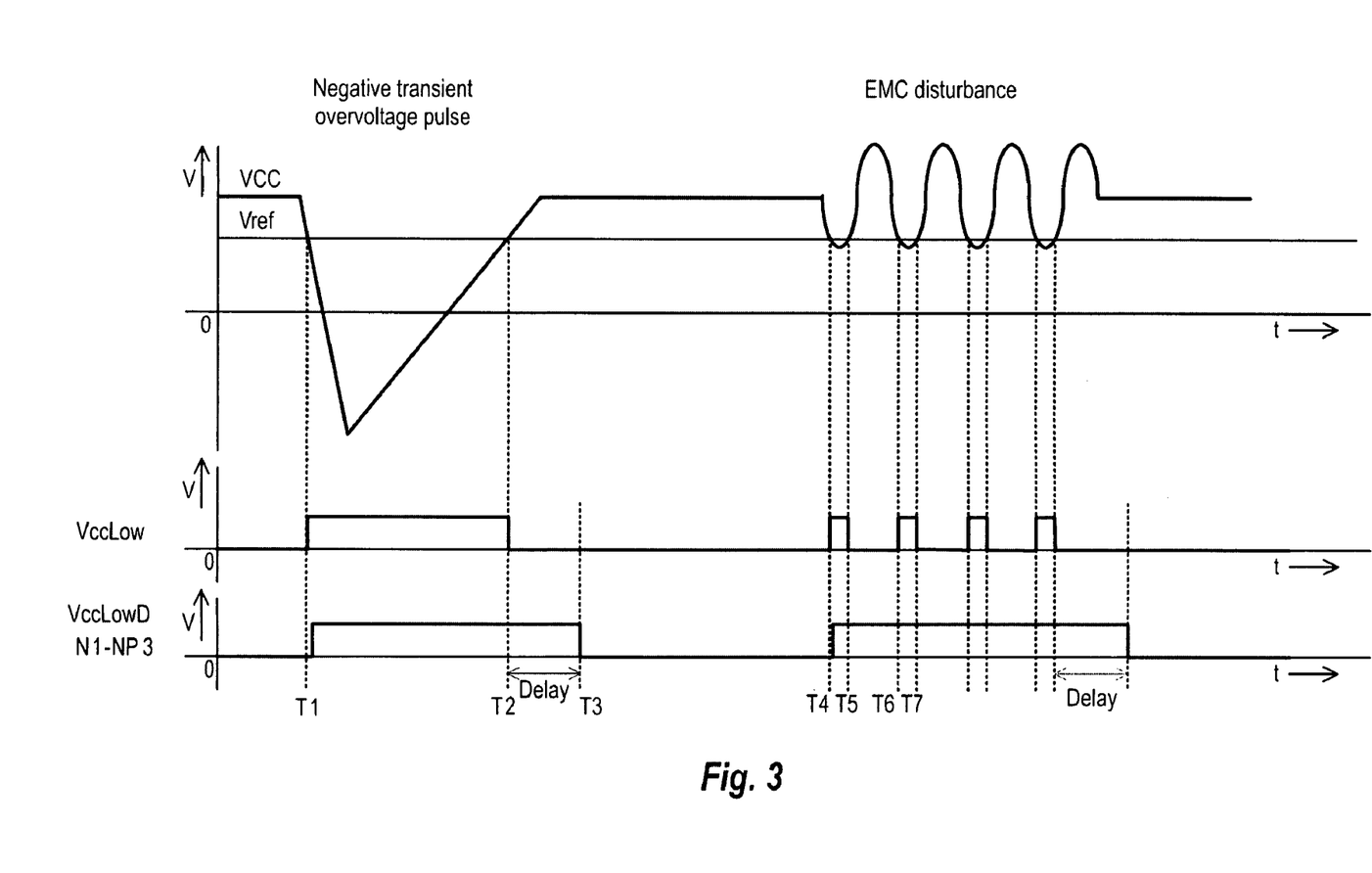
FIG. 3 illustrates signals in a protection circuit according to embodiments of the present invention during negative transient overvoltage pulses and during EMC disturbances on the power supply VCC.

FIG. 3 illustrates a timing chart of the delay circuit functionality. Between 0 and time T1, the power supply signal is higher than the reference voltage Vref, and hence the comparison signal VccLow is low. Just before T1 a negative transient overvoltage pulse start to happen, so that at T1 the power supply voltage VCC drops below the reference voltage Vref. The comparator 12 detects this change, and sets its output voltage VccLow to high. This digitally high comparison signal VccLow is supplied to the delay circuit 13, and the output signal VccLowD is quasi immediately, preferably immediately, set high as well. The negative transient overvoltage pulse reaches a minimum and rises again, so that at time T2 it reaches the level of the reference voltage Vref again. As soon as the power supply voltage VCC is higher than the reference voltage Vref, the comparator 12 sets its output signal VccLow to low. This digitally low comparison signal VccLow is supplied to the delay circuit 13, which is made to follow the transition from high to low in the comparison signal VccLow only after a pre-determined delay time. Therefore the output signal of the delay circuit 13 is only set to low at time T3. The output signal VccLowD of the delay circuit 13 is applied to the gate of the transistor switch MP8. Due to the delay, transistor switch MP8 is only switched back on a time Delay after the power supply has reached a voltage level higher than the reference voltage Vref, and has remained at that level.

If an EMC disturbance is present on the power supply VCC, e.g. a superposed harmonic signal on the power supply VCC, the power supply voltage VCC may drop below the reference voltage Vref only for a short while before going back to a voltage level above the reference voltage Vref, e.g. in the example illustrated in FIG. 3 only between time T4 and time T5. Due to the delay built in in the delay circuit 13, the output signal VccLowD of the delay circuit 13 has not gone back to low when between T6 and T7 the power supply voltage VCC again drops below the reference voltage Vref. Therefore, as long as the EMC disturbance is present on the power supply VCC, the transistor switch MP8 remains off. It is only when the power supply voltage VCC stays above the reference voltage Vref for a long enough time, i.e. longer than the delay applied by the delay circuit 13 for a high to low transition of the VccLowD signal, that the transistor switch MP8 is switched on again.

Furthermore, according to embodiments of the present invention, a level shifter 14 is provided between the delay circuit 13 and the gate of protection transistor MP8. It will change the voltage level of the output signal VccLowD of the delay circuit 13 to voltage levels needed to switch off the transistor MP8 (when VccLowD is logical one) or to switch on the transistor MP8 (when VccLowD is logical zero). The level shifter is such that its input signal VccLowD is converted into a voltage on node NP3. In embodiments of the present invention, the generated voltage on node NP3 may be equal to the voltage level on node N1 if transistor switch MP8 is to be switched off. The generated voltage on node NP3 may be equal to the voltage level on node N1 decreased by a voltage needed to active the transistor switch MP8 if transistor switch MP8 is to be switched on.

In embodiments of the present invention, the delay circuit 13 and the level shifter 14 can be combined into one circuit.

Figure 2:
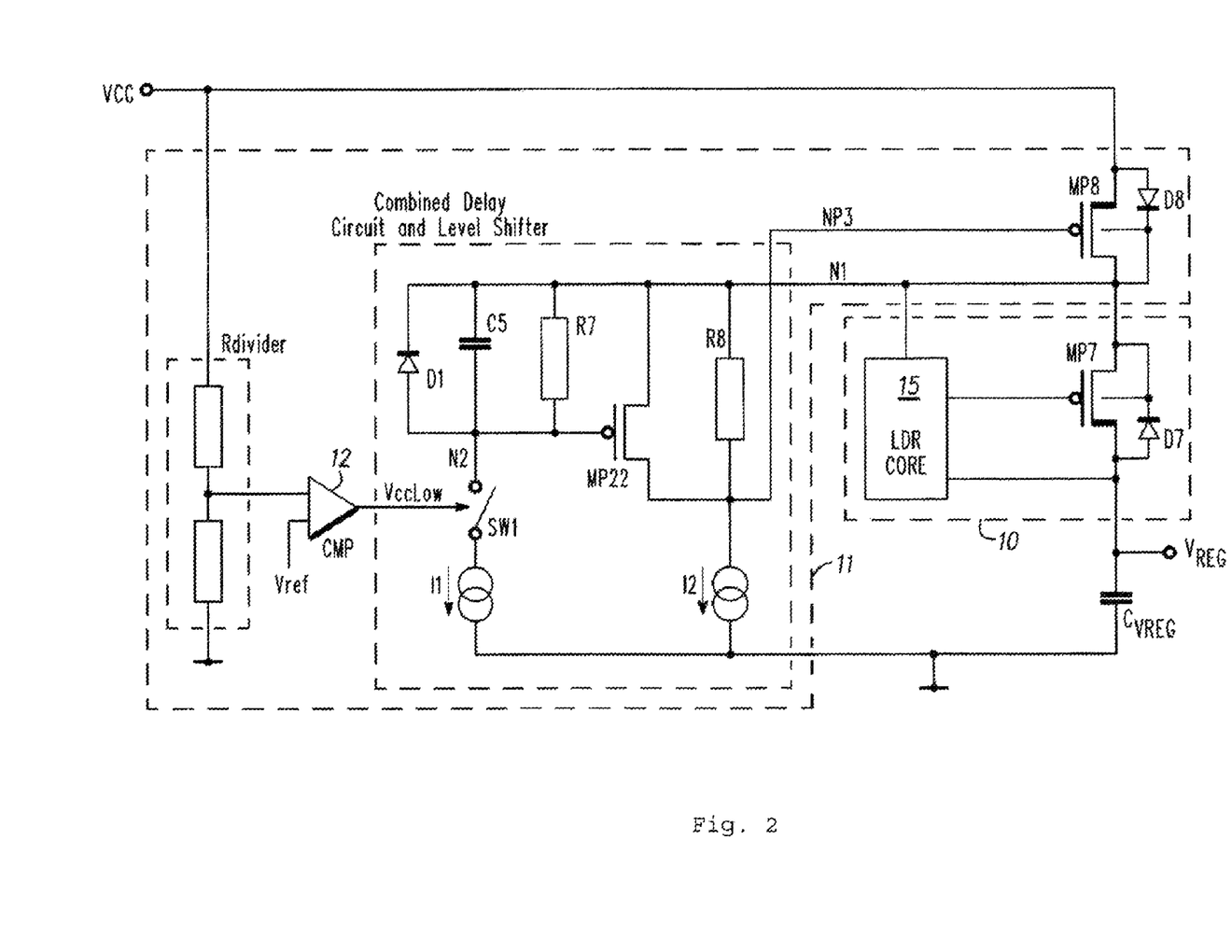
FIG. 2 shows a simplified schematic of a protection device according to embodiments of the present invention, including a combined delay circuit and level shifter.

An example of a protection device including a combined delay circuit and level shifter is shown in FIG. 2.

During normal operation (without disturbances, e.g. EMC disturbances, on the power supply VCC) when the power supply voltage VCC is above a defined threshold voltage defined by the reference voltage Vref, the comparison signal VCCLow is low. This comparison signal VCCLow is applied as a control signal to a switch SW1 which is open. Resistor R7 ensures that MP22 gate-source voltage is low and MP22 is off. The current source I2 creates a voltage drop over resistor R8, that is equal to the gate-source voltage Vgs of the transistor switch MP8 and activates the PMOS transistor switch MP8. There is low voltage drop over this transistor switch MP8, and the total regulator voltage drop can be very small.

If the power supply voltage VCC is decreased below the defined threshold voltage defined by the reference voltage Vref (typically below a minimally allowed operational power supply voltage VCC) the comparison signal VCCLow is set high. This comparison signal VCCLow is applied as a control signal to a switch SW1 which is closed. Via closed switch SW1 the current source I1 creates a voltage drop over resistor R7. PMOS transistor MP22 is activated, causing the gate-source voltage Vgs of transistor switch MP8 to be very low, and hence the transistor switch MP8 to be open, i.e. non-conductive. By this, any current from the output terminal VREG to the power supply VCC is disabled.

Boosting of the current source I1 may be used when a rising edge on the comparison signal VCCLow is detected. This boosting may be used to fastly charge the capacitor C5, by setting the current source to a higher current level during a short period of time when current starts to flow, and to fastly switch off transistor MP8. It creates a totally asymmetrical delaying of the comparison signal VCCLow. Once VccLow is high, the circuit behaves, for a while, as if it remains high, even if this is not the case.

During negative transient overvoltage pulses the transistor switch MP8 is fastly switched off preventing that there is high current flowing from the output terminal VREG of the regulator to the power supply VCC, thus discharging the memory element, e.g. capacitor CVREG, where energy is stored to survive the pulse.

During EMC disturbances having higher amplitudes of the EMC signal, the fast comparator 12 is activated and its output signal VccLow is toggled. The capacitor C5 together with the resistor R7 create a delay cell and keep transistor MP22 on, i.e. conductive, during the EMC disturbances. The time constant of the RC circuit R7C5 should be designed in such a way that for the expected lowest frequency EMC the transistor MP22 stays on during the full period of the EMC disturbance. A Zener diode D1 (or a clamping circuit) may be used to protect the gate of transistor MP22 from overvoltage.

During EMC disturbances, the transistor switch MP8 drain-to-bulk diode D8 is relied on. Although during EMC disturbances the PMOS transistor switch MP8 is switched off, the amplitude of the EMC signal is high. This means that the peak value on the power supply voltage VCC is much higher than the minimum operational supply voltage. During peaks of the power supply voltage VCC the diode D8 is used to supply the regulated voltage VREG. At the same time the diode D8 is preventing discharging the regulated voltage VREG as stored on the memory element, e.g. capacitor CVREG, to the power supply VCC if the power supply voltage VCC goes below the regulated voltage VREG.

It is to be understood that although preferred embodiments, specific constructions and configurations have been discussed herein for devices according to the present invention, various changes or modifications in form and detail may be made without departing from the scope of this invention as defined by the appended claims. For example, the detailed description is given for the case of a low drop regulator. However, the present invention is not limited thereto, and includes a protection circuit which may be used with any electronic circuit, requiring or not requiring a voltage regulator. One example of such electronic circuit is a driver circuit. Furthermore, functionality may be added or deleted from the block diagrams. Steps may be added or deleted to methods described within the scope of the present invention.

What is claimed is:

1. A protection circuit for protecting an electronic circuit against EMC disturbances and/or negative transient overvoltage pulses, the protection circuit comprising:
   a first switch in series between a power supply and the electronic circuit, the first switch having a control terminal and first and second current carrying terminals;
   a comparator for comparing a first operating parameter with a DC signal and producing a comparison signal, the comparison signal being used as a control signal for controlling opening and closing of the first switch;
   a delay circuit that includes a second switch coupled for receiving the control signal and that generates an asymmetric delay and that is adapted for keeping the first switch open for a predetermined amount of time beyond the moment at which the comparison of the first operating parameter with the DC signal produces a comparison signal suitable for closing the first switch, and
   a level shifter having first, second, and third terminals, the first terminal coupled to the control terminal of the first switch and the second terminal coupled to the first terminal of the first switch, and the third terminal coupled to the delay circuit, wherein the level shifter shifts the voltage levels of output signals of the delay circuit so as to be able to control switching of the first switch.

2. A protection circuit according to claim 1, wherein the first switch is a transistor switch.

3. A protection circuit according to claim 2, wherein the transistor switch is a PMOS transistor.

4. A protection circuit according to claim 1, wherein the first operating parameter is a voltage.

5. A protection circuit according to claim 4, wherein the first operating parameter is a reference voltage.

6. A protection circuit according to claim 4, wherein the DC signal is a supply voltage of the power supply.

7. A protection circuit according to claim 1, wherein the pre-determined amount of time is equal to or longer than the maximum duration of an EMC pulse.

8. An integrated circuit supply comprising:
   a voltage regulator;
   a protected electronic circuit; and
   a protection circuit for protecting the electronic circuit against EMC disturbances and/or negative transient overvoltage pulses, the protection circuit comprising:
   a first switch in series between a power supply and the voltage regulator, the first switch having a control terminal and first and second current carrying terminals;
   a comparator for comparing a first operating parameter with a DC signal and producing a comparison signal, the comparison signal used as a control signal for controlling opening and closing of the first switch; and
   a delay circuit that includes a second switch coupled for receiving the control signal and that generates an asymmetric delay and that is adapted for keeping the first switch open for a predetermined amount of time beyond the moment at which the comparison of the first operating parameter with the DC signal produces a comparison signal suitable for closing of the first switch, and
   a level shifter having first, second, and third terminals, the first terminal coupled to the control terminal of the first switch and the second terminal coupled to the first current carrying terminal of the first switch, and the third terminal coupled to the delay circuit.

9. A method for protecting an electronic circuit against EMC disturbances and/or negative transient overvoltage pulses, the method comprising:
   providing a level shifter that generates a level shifting signal;
   opening a switch in response to a comparison of a first operating parameter with a DC signal delivering a control signal suitable for switching off the switch, wherein the switch includes a control terminal and first and second current carrying terminals, and wherein the level shifting signal shifts the control signal so that the voltage level of the control terminal is substantially the same as the voltage level of the first terminal, in response to the first control signal being in a first logic state:
   once opened, keeping the switch open as long as the comparison of the first operating parameter with the DC signal delivers a control signal suitable for keeping switch off,
   keeping the switch open a pre-determined amount of time beyond the moment at which the comparison of the first operating parameter with the DC signal delivers a control signal suitable for closing the switch, wherein the level shifting signal shifts the control signal suitable for switching on the switch so that the voltage level of the control terminal of the switch is less than a voltage at the first terminal of the switch by an amount to activate the switch.

10. A method according to claim 9, further comprising level shifting the control signal delivered by the comparison of the first operating parameter with the DC signal so as to be able to control switching of the switch.

11. A method according to claim 9, wherein the operating parameter and the DC signal are voltages.

12. A method according to claim 11, further comprising level shifting the control signal delivered by the comparison of the first operating parameter with the DC signal so as to be able to control switching of the switch.

13. A method according to claim 11, wherein the first operating parameter is a reference voltage.

14. A method according to claim 13, further comprising level shifting the control signal delivered by the comparison of the first operating parameter with the DC signal so as to be able to control switching of the switch.

15. A method according to claim 11, wherein the DC signal is a DC supply voltage of a power supply.

16. A method according to claim 15, further comprising level shifting the control signal delivered by the comparison of the first operating parameter with the DC signal so as to be able to control switching of the switch.

17. A method according to claim 9, wherein the predetermined amount of time is longer than or equal to the maximum duration of an EMC pulse.

18. A method according to claim 17, further comprising level shifting the control signal delivered by the comparison of the first operating parameter with the DC signal so as to be able to control switching of the switch.

19. A protection circuit for protecting an electronic circuit against EMC disturbances and/or negative transient overvoltage pulses, the protection circuit comprising:
- a first switch in series between a power supply and the electronic circuit, the first switch having a control terminal and first and second current carrying terminals;
- a comparator for comparing a first operating parameter with a DC signal and producing a comparison signal, the comparison signal being used as a control signal for controlling opening and closing of the first switch;
- a delay circuit that generates an asymmetric delay and that is adapted for keeping the first switch open for a predetermined amount of time beyond the moment at which the comparison of the first operating parameter with the DC signal produces a comparison signal suitable for closing of the first switch, wherein the delay circuit comprises:
- a second switch having a control terminal and first and second terminals;
- a capacitor having first and second terminals, the first terminal of the capacitor coupled to the first terminal of the second switch;
- a first resistor having first and second terminals, the first terminal of the first resistor coupled to the first terminal of the capacitor and the second terminal of the first resistor coupled to the second terminal of the capacitor; and
- a first current source having first and second current carrying terminals, the first current carrying terminal coupled to the second terminal of the second switch.

20. A protection circuit according to claim 19, further including:
- a first transistor having a control electrode and first and second current carrying electrodes;
- a second resistor having a first and second terminals, the first terminal coupled to the first current carrying electrode of the first transistor and the second terminal coupled to the second current carrying electrode of the first transistor; and
- a second current source having first and second current carrying terminals, the first current carrying terminal coupled to the second terminal of the second resistor and to the second current carrying electrode of the first transistor.

21. A protection circuit according to claim 20, wherein the control terminal of the first switch is coupled to the second terminal of the second resistor and to the second current carrying electrode of the first transistor and the first current carrying terminal of the first switch is coupled to the first current carrying electrode of the first transistor.

22. A protection circuit according to claim 21, wherein the electronic circuit comprises:
- a low drop regulator core having first, second, and third terminals, the first terminal coupled to the first current carrying terminal of the first switch; and
- a second transistor having a control electrode and first and second current carrying electrodes, the control electrode of the second transistor coupled to the second terminal of the low drop regulator, the first current carrying electrode coupled to the first current carrying terminal of the first switch, and the second current carrying terminal of the second switch coupled to the third terminal of the low drop regulator.

23. An integrated circuit supply, comprising:
- a voltage regulator;
- a protected electronic circuit; and
- a protection circuit for protecting the electronic circuit against EMC disturbances and/or negative transient overvoltage pulses, the protection circuit comprising:
- a first switch in series between a power supply and the voltage regulator;
- a comparator for comparing a first operating parameter with a DC signal and producing a comparison signal, the comparison signal used as a control signal for controlling opening and closing of the first switch; and
- a delay circuit that generates an asymmetric delay and that is adapted for keeping the first switch open for a predetermined amount of time beyond the moment at which the comparison of the first operating parameter with the DC signal produces a comparison signal suitable for closing of the first switch, wherein the delay circuit comprises:
- a second switch having a control terminal and first and second terminals;
- a capacitor having first and second terminals, the first terminal of the capacitor coupled to the first terminal of the second switch;
- a first resistor having first and second terminals, the first terminal of the first resistor coupled to the first terminal of the capacitor and the second terminal of the first resistor coupled to the second terminal of the capacitor; and
- a first current source having first and second current carrying terminals, the first current carrying terminal coupled to the second terminal of the second switch.

* * * * *